United States Patent [19]

Norvell

[11] Patent Number: 4,868,928
[45] Date of Patent: Sep. 26, 1989

[54] WINDPROOF WEATHER-RESISTANT LINED GARMENT MATERIAL

[75] Inventor: Jean Norvell, Newark, Del.

[73] Assignee: W. L. Gore & Associates, Inc., Newark, Del.

[21] Appl. No.: 231,760

[22] Filed: Aug. 12, 1988

Related U.S. Application Data

[63] Continuation-in-part of Ser. No. 111,955, Oct. 21, 1987, abandoned.

[51] Int. Cl.$^4$ ............................................. A41D 27/02
[52] U.S. Cl. ............................................. 2/272; 2/97; 428/246
[58] Field of Search ............... 2/90, 97, 272; 428/102, 428/246, 253

[56] References Cited

U.S. PATENT DOCUMENTS

| 1,326,630 | 12/1919 | Barker | 428/102 |
| 2,263,544 | 11/1941 | Rosenstein | 2/90 |
| 4,194,041 | 3/1980 | Gore et al. | 2/87 |
| 4,344,999 | 8/1982 | Gohlke | 428/212 |
| 4,353,955 | 10/1982 | Cook | 428/246 |
| 4,443,511 | 4/1984 | Worden et al. | 428/246 |
| 4,454,191 | 6/1984 | von Blucher et al. | 428/244 |
| 4,539,255 | 9/1985 | Sato | 428/253 |
| 4,550,466 | 11/1985 | Herman | 2/239 |
| 4,564,552 | 1/1986 | Adiletta | 428/246 |

FOREIGN PATENT DOCUMENTS

| 0081850 | 6/1983 | European Pat. Off. |  |
| 2737756 | 3/1979 | Fed. Rep. of Germany |  |
| 3244386 | 6/1984 | Fed. Rep. of Germany | 2/272 |
| 2155853 | 10/1985 | United Kingdom |  |

Primary Examiner—Werner H. Schroeder
Assistant Examiner—Diana L. Biefeld
Attorney, Agent, or Firm—Gary A. Samuels

[57] ABSTRACT

A weather-resistant windproof lined garment having a stretchable liquid waterproof, water-vapor-transmitting liner. The garment provides protection for active outdoor wear for golf, walking, tennis, hiking, soccer, and the like.

8 Claims, 2 Drawing Sheets

WINDPROOF WEATHER-RESISTANT LINED GARMENT MATERIAL

REFERENCE TO RELATED APPLICATIONS

This application is a continuation-in-part of application Ser. No. 111,955 filed Oct. 21, 1987 now abandoned.

FIELD OF THE INVENTION

The present invention relates generally to weather resistant lined garment materials, in particular to weather-resistant windproof lined sweaters and undergarments, and to a method for making them.

BACKGROUND OF THE INVENTION

There is a need for very lightweight weather-resistant garments useful for less severe or less demanding wear such as late or early season outdoor sporting events or athletic participation, such as golf, walking, hiking, football, soccer, baseball, or the like for spectator sport attendance.

The limited give or stretch of woven textile materials causes garments utilizing them as a part of a laminate, or as one of the layers, to have limits to comfortable movement. For example, if a wearer bends the arms at the elbows or twists the upper torso in golf swing, a woven textile will hug the body contours to give some degree of pulling discomfort, which may impede free movement. Garments which offer the least resistance to body movements are the most comfortable. Comfort and fit are key attributes from a wearers standpoint and are achieved by reducing the restraint imposed on the body by the garment and by increasing the give or stretch of the fabric.

One of the ways known presently to handle the problem of weather-resistance has been to use woven textile cloth combinations with waterproof membranes of porous hydrophobic plastics which may also form composites with hydrophilic materials such that the combination or composite will not pass liquid water, but will transmit water vapor at a rate to keep the interior of a garment utilizing such a material dry. Exemplary of materials and garments utilizing this method for weather resistance are those fashioned from GORE-TEX ® membrane and GORE-TEX ® laminate prepared according to U.S. Pat. Nos. 4,194,041; 4,443,551; 3,953,566; and 4,187,390. Such materials used in garments render them windproof as well.

SUMMARY OF THE INVENTION

The present invention provides a stretchable weather-resistant, windproof lined garment material. It can comprise a sweater, shirt, light Jacket, or trousers, or the like. The outer layer of the lined garment material is an expandable knitted or woven textile fabric. The stretchable inner layer of the lined garment is made from a porous hydrophobic polymer layer which has been coated with a hydrophilic layer, which is in turn bonded to an elastomeric textile layer, such as a spandex layer. The inner and outer layers are attached by sewing or other means at the borders of the garment.

DESCRIPTION OF THE PREFERRED EMBODIMENTS

Figure 1:
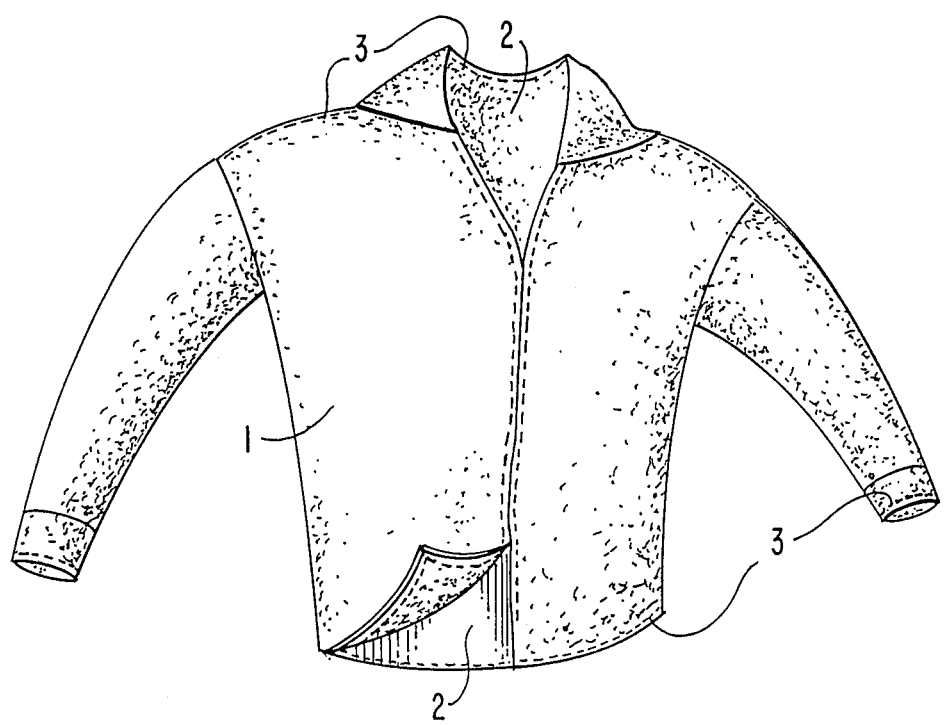
FIG. 1 shows the lined garment material of the invention in the form of an upper body garment.

The invention is now described with reference to the figures in order to better delineate the preferred embodiments. FIG. 1 shows the weather-resistant windproof lined garment material of the invention in which the outer stretchable knitted fiber layer 1 is usually a synthetic or natural fiber knit or woven fabric, preferably a sweater. The inner stretchable layer 1 aids in making the garment warm in cool to cold weather. Examples of textiles used for the outer layer 1 include nylon or polyester warp limit or a blend of both or a knit raschel or tricot knit. It can be wool.

Figure 2:
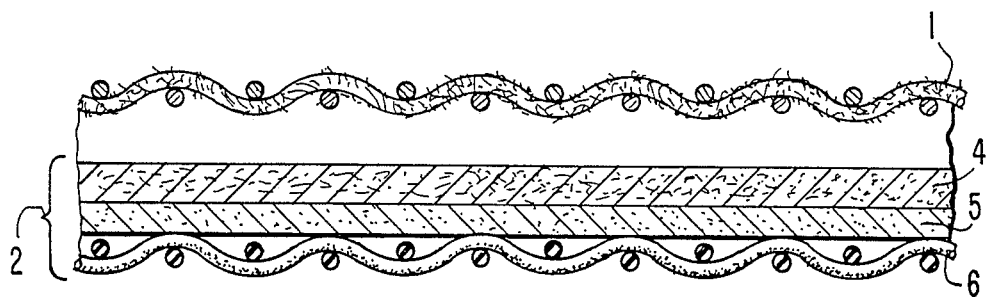
FIG. 2 depicts a cross-section of the layered lined garment utilized in this invention.

Because layer 2 has insulative properties that aid in making the garment warm and is windproof, layer 1 need not be very thick. The two layers 1 and 2 are attached by sewing at the edge junctions at as many points as are needed or desired such as wrist, neck, waist, and front closure edges. FIG. 2 displays a cross-section of the stretchable two-layer material of the invention, where the outer stretchable layer 2 is separated by an air gap from the stretchable inner liner layer 1.

Figure 3:
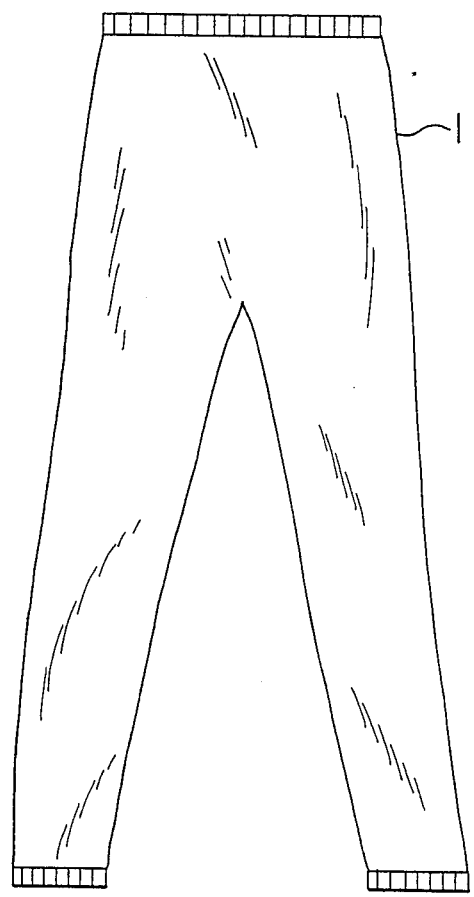
FIG. 3 displays the lined garment of the invention in the form of a lower body garment.

Layer 2 is made up from a layer of porous hydrophobic polymer 2, preferably the porous expanded polytetrafluoroethylene (EPTFE) membrane described in U.S. Pat. Nos. 3,953,566, 3,962,153, 4,096,227, and 4,187,390, coated with a hydrophilic layer 5 of a polyurethane as taught by Gore and Allen in U.S. Pat. No. 4,194,041. The liquid water-resistant water-vapor transmitting layer 4 can be a hydrophobic polyurethane, or a porous polyolefin. This liquid water resisting water vapor-transmitting composite is further bonded to a woven or knitted elastomeric textile layer 6. The combination of layers 4 and 5 are shown in the above patents to be waterproof to liquid water, resist the surface active agents in perspiration, but still permit the evaporation of perspiration by transmission of water vapor through the combination. This combination of layers 4 and 5 can be made stretchable according to Worden. et al, in U.S. Pat. No. 4,443,511, by stretching the composite and then relaxing it. This stretchable material is then bonded to a layer 6 of polyurethane rubber, defined as spandex in the art, in the form of a woven or knitted spandex textile material. A well-known example of spandex is the trademark Lycra ® spandex manufactured by E. I. Dupont de Nemours and Company. Then taken all together, the complete windproof layered material of the invention, outer textile layer and inner combination of hydrophobic polymer/hydrophilic polymer/spandex textile, tend to stretch together as a unit. i.e. move together mechanically as a unit. The layers 4 and 5 in combination with spandex 4 is preferably united with layer 1 into a garment in such a manner that the direction of highest stretchability of layers 4 and 5 lies around the circumference of the garment. i.e., across the back, arms, and around the elbows so as to take maximum advantage of the favorable properties of the materials of manufacture. FIG. 3 describes a lower body garment 7.

It is thus seen that this invention provides lightweight stretchable, garment materials which can be worn under comfortable clothing in cooler weather for outdoor activities - a season-extending garment combination or can be a sweater. The garment may be reversed or turned inside out to protect against a sudden downpour of rain to keep the wearer dry. It will be seen by those skilled in the art that various materials may be substituted for those exemplified above and that other variations and modifications may be made in the methods utilized in making the garments without departing from the spirit of the invention, the scope of which is delineated by the appended claims.

I claim:

1. A weather-resistant, windproof, lined garment, said garment comprising:
   (a) an outer layer comprising a stretchable knit or woven textile and
   (b) an inner stretchable liner layer comprising a porous liquid water resistant, water vapor transmitting polymer composed of porous expanded polytetrafluoroethylene that is coated on one side with a hydrophilic polymer and is attached on the other side to an elastomeric textile layer, said inner stretchable liner layer positioned in the garment such that the side containing the hydrophobic polymer coating is adjacent the outer layer.

2. A garment of claim 1 wherein the outer layer comprises a knitted textile.

3. A garment of claim 2 wherein said elastomeric textile layer comprises an elastomeric polyurethane.

4. A garment of claim 3 wherein said elastomeric textile layer is manufactured from a blend of an elastomeric polyurethane with a second textile.

5. A garment of claim 4 wherein said second textile is comprised of polyamide fiber.

6. A garment of claim 1 wherein said stretchable liner is aligned within said garment such that the direction of maximum stretchability is around the circumference of said garment.

7. A garment of claim 1 wherein the outer layer is wool.

8. A garment of claim 1 wherein the outer layer is a synthetic stretchable knit.

* * * * *